United States Patent
Yi et al.

(10) Patent No.: US 8,249,103 B2
(45) Date of Patent: Aug. 21, 2012

(54) METHOD FOR TRANSMITTING AND RECEIVING CONTROL DATA IN MOBILE TELECOMMUNICATIONS SYSTEM AND TRANSMITTER AND RECEIVER OF MOBILE TELECOMMUNICATIONS

(75) Inventors: Seung-June Yi, Gyeonggi-Do (KR); Sung-Jun Park, Gyeonggi-Do (KR); Young-Dae Lee, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 12/669,022

(22) PCT Filed: Aug. 6, 2008

(86) PCT No.: PCT/KR2008/004560
§ 371 (c)(1),
(2), (4) Date: Jan. 13, 2010

(87) PCT Pub. No.: WO2009/022807
PCT Pub. Date: Feb. 19, 2009

(65) Prior Publication Data
US 2010/0184424 A1    Jul. 22, 2010

(30) Foreign Application Priority Data
Aug. 4, 2008 (KR) .................. 10-2008-0076181

(51) Int. Cl.
*H04J 3/16* (2006.01)

(52) U.S. Cl. ...................................... 370/469

(58) Field of Classification Search .................. 370/242, 370/310, 241, 252, 328, 469–479, 82–83, 370/395.1–395.7, 464–468
See application file for complete search history.

(56) References Cited

U.S. PATENT DOCUMENTS

| | | |
|---|---|---|
| 6,445,917 B1 | 9/2002 | Bark et al. |
| 6,594,240 B1 | 7/2003 | Chuah et al. |
| 6,728,918 B1 | 4/2004 | Ikeda et al. |
| 7,171,163 B2 | 1/2007 | Terry et al. |
| 7,227,857 B2 | 6/2007 | Kuo |
| 7,227,868 B2 | 6/2007 | Inden |

(Continued)

FOREIGN PATENT DOCUMENTS

EP    1343267 A2    9/2003

(Continued)

OTHER PUBLICATIONS

Kashima, Method and Apparatus for Providing Timing Alignment, U.S. Appl. No. 60/944,662.

(Continued)

*Primary Examiner* — Melody Mehrpour
(74) *Attorney, Agent, or Firm* — Birch, Stewart, Kolasch & Birch, LLP

(57) ABSTRACT

A method for transmitting and receiving control data of a PDCP layer, a transmitting apparatus and a receiving apparatus in a mobile communication system are disclosed. Several control information (e.g., information regarding a status report and information about an HC feedback) are simultaneously transmitted through a single control PDU, so the size of headers can be reduced, compared with the case where each control information is transmitted through each control PDU from a transmitting side to a receiving side, thus improving transmission efficiency and efficiency of resources.

12 Claims, 8 Drawing Sheets

U.S. PATENT DOCUMENTS

| | | | |
|---|---|---|---|
| 7,295,573 B2 | 11/2007 | Yi et al. | |
| 7,313,116 B2 | 12/2007 | Lee et al. | |
| 7,710,930 B2 | 5/2010 | Kwak | |
| 7,817,595 B2 | 10/2010 | Wu | |
| 7,821,979 B2 | 10/2010 | Lee et al. | |
| 7,978,616 B2* | 7/2011 | Chun et al. | 370/242 |
| 8,027,363 B2* | 9/2011 | Chun et al. | 370/469 |
| 8,059,597 B2* | 11/2011 | Park et al. | 370/329 |
| 8,081,662 B2* | 12/2011 | Chun et al. | 370/474 |
| 2002/0001314 A1 | 1/2002 | Yi et al. | |
| 2002/0009999 A1 | 1/2002 | Lee et al. | |
| 2002/0122411 A1 | 9/2002 | Zimmerman et al. | |
| 2003/0007490 A1 | 1/2003 | Yi et al. | |
| 2004/0103435 A1 | 5/2004 | Yi et al. | |
| 2004/0146019 A1 | 7/2004 | Kim et al. | |
| 2004/0147236 A1 | 7/2004 | Parkvall et al. | |
| 2004/0156330 A1 | 8/2004 | Yi et al. | |
| 2004/0184438 A1 | 9/2004 | Terry | |
| 2005/0039101 A1 | 2/2005 | Torsner | |
| 2005/0042987 A1 | 2/2005 | Lee et al. | |
| 2005/0047416 A1 | 3/2005 | Heo et al. | |
| 2005/0096017 A1 | 5/2005 | Kim | |
| 2005/0118992 A1 | 6/2005 | Jeong et al. | |
| 2005/0237932 A1 | 10/2005 | Liu | |
| 2005/0254467 A1 | 11/2005 | Li et al. | |
| 2005/0259662 A1 | 11/2005 | Kim et al. | |
| 2006/0067238 A1 | 3/2006 | Olsson et al. | |
| 2006/0072503 A1 | 4/2006 | Kim et al. | |
| 2006/0092972 A1 | 5/2006 | Petrovic et al. | |
| 2006/0128312 A1 | 6/2006 | Declerck et al. | |
| 2006/0142020 A1 | 6/2006 | Mueckenheim et al. | |
| 2006/0154680 A1 | 7/2006 | Kroth et al. | |
| 2006/0165045 A1 | 7/2006 | Kim et al. | |
| 2006/0203780 A1 | 9/2006 | Terry | |
| 2006/0233200 A1 | 10/2006 | Fifield et al. | |
| 2006/0251027 A1 | 11/2006 | Chun et al. | |
| 2006/0251105 A1 | 11/2006 | Kim et al. | |
| 2006/0264179 A1 | 11/2006 | Bonneville et al. | |
| 2006/0268798 A1 | 11/2006 | Kim et al. | |
| 2006/0280145 A1 | 12/2006 | Revel et al. | |
| 2007/0060139 A1 | 3/2007 | Kim et al. | |
| 2007/0079207 A1 | 4/2007 | Seidal et al. | |
| 2007/0091810 A1 | 4/2007 | Kim et al. | |
| 2007/0189205 A1 | 8/2007 | Terry et al. | |
| 2007/0201397 A1 | 8/2007 | Zhang | |
| 2007/0268861 A1 | 11/2007 | Diachina et al. | |
| 2007/0274278 A1 | 11/2007 | Choi et al. | |
| 2007/0297367 A1 | 12/2007 | Wang et al. | |
| 2008/0051098 A1 | 2/2008 | Rao | |
| 2008/0182609 A1 | 7/2008 | Somasundaram et al. | |
| 2008/0186944 A1 | 8/2008 | Suzuki et al. | |
| 2008/0268878 A1 | 10/2008 | Wang et al. | |
| 2008/0305819 A1 | 12/2008 | Chun et al. | |
| 2008/0318578 A1 | 12/2008 | Worrall | |
| 2009/0016301 A1* | 1/2009 | Sammour et al. | 370/331 |
| 2009/0104890 A1 | 4/2009 | Wang et al. | |
| 2009/0175163 A1 | 7/2009 | Sammour et al. | |

FOREIGN PATENT DOCUMENTS

| | | |
|---|---|---|
| EP | 1689130 A1 | 8/2006 |
| EP | 1768297 A2 | 3/2007 |
| KR | 10-2001-0045783 A | 6/2001 |
| KR | 10-2002-0004645 A | 1/2002 |
| KR | 10-2003-0060055 A | 7/2003 |
| KR | 10-2003-0068743 A | 8/2003 |
| KR | 10-2003-0087914 A | 11/2003 |
| KR | 10-2004-0034398 A | 4/2004 |
| KR | 10-2004-0039944 A | 5/2004 |
| KR | 10-2004-0072961 A | 8/2004 |
| KR | 10-2005-0022988 A | 3/2005 |
| KR | 10-2005-0081836 A | 8/2005 |
| KR | 10-2005-0099472 A | 10/2005 |
| KR | 10-2005-0103127 A | 10/2005 |
| KR | 10-2006-0004935 A | 1/2006 |
| KR | 10-2006-0014910 A | 2/2006 |
| KR | 10-2006-0029452 A | 4/2006 |
| KR | 10-2006-0042858 A | 5/2006 |
| KR | 10-2006-0069378 A | 6/2006 |
| KR | 10-2006-0079784 A | 7/2006 |
| KR | 10-2006-0090191 A | 8/2006 |
| KR | 10-2006-0134058 A | 12/2006 |
| KR | 10-2007-0076374 A | 7/2007 |
| WO | WO 2004/042963 A1 | 5/2004 |
| WO | WO 2005-039108 A2 | 4/2005 |
| WO | WO 2006/052086 A2 | 5/2006 |
| WO | WO 2007/039023 A1 | 4/2007 |
| WO | WO 2007/052900 A1 | 5/2007 |
| WO | WO 2007/078155 A2 | 7/2007 |
| WO | WO 2007/078173 A1 | 7/2007 |
| WO | WO 2007/078174 A1 | 7/2007 |
| WO | WO 2007/126793 A2 | 11/2007 |
| WO | WO 2007/147431 A1 | 12/2007 |

OTHER PUBLICATIONS

Wu et al., Enhanced Random Access Response Formats in E-UTRAN, U.S. Appl. No. 61/006,348.

Cohen, "An Improved SSCOP-like Scheme for Avoiding Unnecessary Retransmissions and Achieving Ideal Throughput," IEEE, 1996, pp. 855-862, XP010158150.

"Digital cellular telecommunications system (Phase 2+); Functional stage 2 description of Location Services (LCS) in GERAN (3GPP TS 43.059 version 7.3.0 Release7)", ETSI TS 143 059 V7.3.0, May 2007, 71 pages, XP014038519.

ZTE, "Redundant retransmission restraint in RLC-AM", 3GPP TSG-RAN WG2 meeting #53, May 8-12, 2006, pp. 1-5, R2-061234, Shanghai, China, XP050131180.

"Uplink Scheduling for VoIP", [Online] No. R2-070476, Feb. 12, 2007. pp. 1-15, XP008125208 Retrieved from the Internet: URL:http://www.3gpp.org/ftp/tsg_ran/WG2_RL2?TSGR2_57/Documents/R2-070476.zip>.

Ericsson: "Scheduling Request in E-UTRAN", vol. RAN WG1, no. Sorrento, Italy; Jan. 10, 2007, XP050104502.

LG Electronics Inc: "UE state transition in LTE_ACTIVE", vol. RAN WG2, no. Athens, Greece; 20060323, Mar. 23, 2006, XP050130928.

Motorola: "Contention-free Intra-LTE Handover", vol. RAN WG2, no. St. Louis, USA; Feb. 9, 2007, XP050133763.

Nokia: "Buffer reporting for E-UTRAN", [Online] vol. R2-060829, pp. 1-5, XP002503218, Retrieved from the Internet: URL:www.3gpp.org> [retrieved on Mar. 1, 2006].

Texas Instruments: "UL Synchronization Management and Maintenance in E-UTRA", vol. RAN WG1, no. Kobe, Japan; May 1, 2007, XP050105936.

Texas Instruments: "UL Synchronization Management in LTE_ACTIVE", vol. RAN WG1, no. St. Julian; Mar. 21, 2007, XP050105413.

Sammour et al., "Method and Apparatus of Performing Packet Data Convergence Protocol Reset," U.S. Appl. No. 61/019,058.

Wang et al., "Operation of Control Protocol Data Units in Packet Data Covergence Protocol," U.S. Appl. No. 60/976,139.

"Consideration on UL buffer reporting," 3GPP TSG-RAN WG2# 55, R2-062934, XP-002513924, pp. 1-3, Oct. 9-13, 2006.

"Optimized Buffer Status Reporting," 3GPP TSG-RAN WG2# 58 bis Meeting, Tdoc R2-072515, XP-002503220, 6 pages, Jun. 25-29, 2007.

Asustek, "On-line recovery of HFN synchronization due to RLC UM SN problem," 3GPP TSG-RAN WG2 Meeting #44, R2-041940, Sophia-Antipolis, France, Oct. 4-8, 2004, pp. 1-4.

Rapporteur (Asustek), "Summary of HPN de-synchronization problem off-line email discussion," 3GPP TSG RAN WG2 #46, Tdoc R2-050318, Scottsdale, USA, Feb. 14-18, 2005, 4 pages.

* cited by examiner

FIG. 6

3 Control Information Case

| D/C | Control PDU Type | Length | | |
|---|---|---|---|---|
| Length | E | Control PDU Type | Length | |
| Length | | E | Control PDU Type | Length |
| Length | | | E | Reserved |
| Control Information #1 | | | | |
| Control Information #2 | | | | |
| Control Information #3 | | | | |

(a)

2 Control Information Case

| D/C | Control PDU Type | Length | |
|---|---|---|---|
| Length | E | Control PDU Type | Length |
| Length | | E | Reserved |
| Control Information #1 | | | |
| Control Information #2 | | | |

3 Control Information Case

| D/C | Control PDU Type | E | Length | | |
|---|---|---|---|---|---|
| Length | | Control PDU Type | E | Length | |
| Length | | | | Control PDU Type | E |
| Control Information #1 | | | | | |
| Control Information #2 | | | | | |
| Control Information #3 | | | | | |

(a)

2 Control Information Case

| D/C | Control PDU Type | E | Length | |
|---|---|---|---|---|
| Length | | Control PDU Type | E | Reserved |
| Control Information #1 | | | | |
| Control Information #2 | | | | |

3 Control Information Case

| D/C | E | Control PDU Type | Length | |
|---|---|---|---|---|
| Length | | E | Control PDU Type | Length |
| Length | | | E | Control PDU Type |
| Control Information#1 | | | | |
| Control Information #2 | | | | |
| Control Information #3 | | | | |

(a)

2 Control Information Case

| D/C | E | Control PDU Type | Length | |
|---|---|---|---|---|
| Length | | E | Control PDU Type | Reserved |
| Control Information #1 | | | | |
| Control Information#2 | | | | |

(b)

METHOD FOR TRANSMITTING AND RECEIVING CONTROL DATA IN MOBILE TELECOMMUNICATIONS SYSTEM AND TRANSMITTER AND RECEIVER OF MOBILE TELECOMMUNICATIONS

TECHNICAL FIELD

The present invention relates to transmission and reception of control data of a PDCP layer in a mobile communication system such as an E-UMTS (Evolved-Universal Mobile Telecommunications System).

BACKGROUND ART

FIG. 1 is a network structure of an LTE (Long Term Evolution) system, the related art mobile communication system. For the LTE system, which has evolved from the existing UMTS system, basic standardizations are ongoing in the 3GPP.

An LTE network can be divided into an E-UTRAN (Evolved UMTS Terrestrial Radio Access Network) and a CN (Core Network). The E-UTRAN includes a terminal (or UE (User Equipment)), a base station (eNB (Evolved NodeB)), and an access gateway (aGW). The access gateway may be divided into a part that handles processing of user traffic and a part that handles control traffic. In this case, the access gateway part that processes the user traffic and the access gateway part that processes the control traffic may communicate with each other by using a new interface. One or more cells may exist in a single eNB. An interface for transmitting user traffic or control traffic may be used between eNBs. The CN may include the access gateway and a node or the like for user registration of the UE. An interface for discriminating the E-UTRAN and the CN may be used.

FIG. 2 shows an exemplary structure of a control plane of a radio interface protocol between the UE and the E-UTRAN based on the 3GPP radio access network standards. FIG. 3 shows an exemplary structure of a user plane of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting data information and a control plane (C-plane) for transmitting control signals. The protocol layers in FIGS. 2 and 3 can be categorized as a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane in FIG. 3 will now be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side and that of a receiving side, data is transferred via the physical channel.

The second layer includes various layers. First, a medium access control (MAC) layer serves to map various logical channels to various transport channels and performs logical channel multiplexing by mapping several logical channels to a single transport channel. The MAC layer is connected to an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments or concatenates data received from an upper layer to adjust the data size so as for a lower layer to suitably transmit the data to a radio interface. In addition, in order to guarantee various QoSs required by each radio bearer RB, the RLC layer provides three operation modes: a TM (Transparent Mode); a UM (Unacknowledged Mode); and an AM (Acknowledged Mode). In particular, the RLC layer operating in the AM (referred to as an 'AM RLC layer', hereinafter) performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a smaller bandwidth. The header compression increases a transmission efficiency between radio interfaces by allowing the header part of the data to transmit only the essential information.

The RRC layer located at the uppermost portion of the third layer is defined only in the control plane, and controls a logical channel, a transport channel and a physical channel in relation to configuration, reconfiguration, and the release or cancellation of radio bearers (RBs). Here, the RBs refer to a logical path provided by the first and second layers of the radio protocol for data transmission between the UE and the UTRAN. In general, the set-up (configuration) of the RB refers to the process of stipulating the characteristics of a radio protocol layer and a channel required for providing a particular data service, and setting the respective detailed parameters and operation methods.

FIG. 4 shows a PDCP entity structure. Hereinafter, the PDCP entity will now be described in detail. In this respect, however, the blocks as shown in FIG. 4 are functional blocks which may be different from those actually implemented.

The PDCP entity is upwardly connected with the RRC layer or a user application, and downwardly connected with the RLC layer. Its detailed structure is as follows.

A single PDCP entity includes a PDCP transmitting side and a PDCP receiving side. The left transmitting side configures an SDU received from an upper layer as a PDU or configures control information generated by the PDCP entity itself as a PDU and transmits the same to the receiving side of the peer PDCP entity, and the right receiving side extracts the PDCP SDU or the control information from the PDCP PDU received from the transmitting side of the peer PDCP entity.

As mentioned above, the PDU generated by the transmitting side of the PDCP entity includes two types of PDUs: a data PDU and a control PDU. First, the PDCP data PDU is a data block created by processing the SDU received from the upper layer by the PDCP; and the PDCP control PDU is a data block generated by the PDCP itself to transfer control information to the peer entity.

The PDCP Data PDU is generated from RBs of both the user plane and the control plane, and some functions of the PDCP are selectively applied according to a plane in use. Namely, a header compression function is applied only for the user plane data, and an integrity protection function among security functions is applied only for the control plane data.

Besides the integrity protection function, the security function also includes a ciphering function for maintaining the security of data. The ciphering function is applied to both the user plane data and the control plane data.

The PDCP control PDU is generated only at the user plane RB and includes two types: a 'PDCP status report' for informing the transmitting side about a PDCP reception buffer status and an 'HC (Header Compression) feedback packet' for informing a header compressor about a status of a receiving side header decompressor.

FIG. 5 is a block diagram showing a procedure of processing each PDCP PDU in the PDCP entity.

Specifically, FIG. 5 shows the process of how the three types of PDCP PDUs, namely, the PDCP data PDU, the PDCP control PDU for PDCP status report, and a PDCP control PDU for HC feedback, are processed through a path to a path, $\hat{8}$. The PDCP processing paths with respect to the respective PDUs are as follows.

1. The processing of the PDCP data PDU in the PDCP entity relates to the paths $\hat{1}$, $\hat{3}$ and $\hat{7}$. Each path will now be described.

Path $\hat{1}$: The transmitting side PDCP performs header compression and security on the SDU received from the upper layer, configures a PDCP data PDU by adding a PDCP SN (Sequence Number), a D/C field indicating whether or not a PDU is a data PDU or a control PDU, or the like to a header, and transmits the same to the receiving side PDCP (namely, the peer PDCP). The header compression may be performed by a header compressor.

Path $\hat{8}$: The receiving side PDCP first removes the header of the PDCP data PDU received from the lower layer, performs a security check and header decompression on the PDCP data PDU to restore the PDCP SDU, and transfers the same to an upper layer. In this case, the PDCP SDU is delivered to the upper layer in sequence, and if the PDCP SDU has been received out of sequence, it is reordered in a reception buffer and then delivered to the upper layer. The header decompression may be performed by a header decompressor.

Path $\hat{3}$: The transmitting side PDCP may piggyback an HC feedback packet to the PDCP data PDU and transmit the same (e.g., the HC feedback packet is added to or included in the PDCP data PDU and then transmitted). In this case, as for the HC feedback packet, information is received from header decompression of the receiving side PDCP co-located with the transmitting side PDCP, and when the PDCP SDU received from the upper layer is header-compressed, the HC feedback packet is piggybacked thereto to configure a packet. Thereafter, the PDCP SDU and the piggybacked HC feedback packet are subject to security, and the PDCD SN, the D/C field, or the like, are added to the header to configure a PDCP data PDU, which is then transmitted from the transmitting side PDCP to the receiving side PDCP.

Path $\hat{7}$: When the receiving side PDCP receives the PDCP data PDU, it removes its header and performs security checking and header decompression thereon to restore the PDCP SDU. At this time, if the piggybacked HC feedback packet exists, the receiving side PDCP extracts it and transfers it to the header compression of the co-located transmitting side PDCP. Then, the header compression of the transmitting side PDCP can determine whether to transmit a next packet with a full header or a compressed header according to the feedback information.

2. The processing of the PDCP control PDU for the PDCP status report in the PDCP entity relates to the path $\hat{2}$ and the path $\hat{5}$. Each path will now be described.

Path $\hat{2}$: the receiving side PDCP may check a reception buffer and if there is a PDCP SDU that has not been received, the receiving side PDCP may request its re-transmission from the transmitting side of the PDCP. In this case, the status of the reception buffer is configured as a PDCP status report, and the configured PDCP status report is transmitted in the form of a control PDU to the co-located transmitting side of the PDCP. The header of the PDCP control PDU includes the D/C field indicating whether a PDU is a data PDU or the control PDU and a CPT (Control PDU Type) field indicating whether the control PDU includes the PDCP status report or the HC feedback packet.

Path $\hat{5}$: When the receiving side PDCP receives the PDCP control PDU including the PDCP status report, it transfers the received PDCP status report to the co-located transmitting side PDCP. The co-located transmitting side PDCP re-transmits a PDCP SDU that its peer receiving side PDCP has not received, based on the PDCP status report.

3. The processing of the PDCP control PDU for HC feedback in the PDCP entity relates to the path $\hat{4}$ and the path $\hat{6}$. Each path will now be described.

Path $\hat{4}$: The transmitting side PDCP may include the HC feedback packet in the PDCP control PDU, rather than piggybacking it to the PDCP data PDU, and independently transmit it. In this case, the information about the HC feedback packet is received from header decompression of the receiving side PDCP which is co-located with the transmitting side PDCP. The HC feedback packet may be configured into the PDCP control PDU by adding the D/C field and the CPT field to the header, and then transmitted to the receiving side of the peer PDCP.

Path $\hat{6}$: When the receiving side PDCP receives the PDCP control PDU including the HC feedback packet, it transfers the same to the header compression of the co-located transmitting side PDCP. Then, the header compression of the transmitting side PDCP may determine whether to transmit a next packet with a full header or a compressed header according to the feedback information.

As mentioned above, the PDCP may transmit the two types of information, i.e., the status report and the HC feedback, with the control PDU. If the two types of information are simultaneously transmitted, they are configured as independent control PDUs and then transmitted. If various control information are transmitted in the form of the respective independent control PDUs, the size of the headers is increased.

Namely, the PDCP layer requires headers each indicating each control information, and the RLC layer, the lower layer of the PDCP layer, requires a length indicator for informing about the size of each PDCP control PDU in the header, resulting in an increase in the size of the headers.

TECHNICAL GIST OF THE PRESENT INVENTION

Therefore, it is an object of the present invention to define a structure of a single control PDU such that a transmitting side PDCP (Packet Data Convergence Control) can include several control information therein and transmit the same, whereby several control information can be transmitted through the single defined control PDU to thus reduce the size of headers and improve efficiency of resources.

To achieve the above object, there is provided a method for transmitting control data of a PDCP layer in a mobile communication system, including: generating a control PDU (Packet/Protocol Data Unit) including one or more first control information and one or more second control information generated at a PDCP layer; and transmitting the generated control PDU.

The first control information may be information about a PDCP status report, and the second information may be header compression feedback information.

The generated control PDU may include an E (Extension) field indicating whether next control information exists.

The E field may indicate the presence of fields in the order of a 'Control PDU Type' field, a 'Length' field, 'E' field, as header information corresponding the next control information. If there is a 'Reserved' field for a header byte alignment, the E field may indicate the presence of the 'Reserved' field and that control information starts at the next byte. If there is no 'Reserved' field, the E field may indicate that control information starts at the next byte.

The E field may indicate the presence of fields in the order of the 'Length' field of current control information, the 'Control PDU Type' field of next control information, and the 'E' field of the next control information, or may indicate the presence of the 'Reserved' field for a header byte alignment and indicate that control information starts at the next byte.

The E field may indicate the presence of fields in the order of the 'Control PDU Type' field of the current control information, the 'Length' field of the current control information, and the 'E' field of the next control information. Or, the E field may indicate the presence of fields in the order of the 'Control PDU Type' field of the current control information and the 'Reserved' field for the byte alignment, and may indicate that control information starts at the next byte.

The generated control PDU may include a header having header information corresponding to the first control information and/or second control information, and a payload having the first control information and/or second control information, and the header may include a 'D/C' field, one or more 'control PDU Type' fields, the 'Length' field, and the 'E' field.

The generated control PDU may further include the 'Reserved' field for the header byte alignment, and the 'Reserved' field is included in the header.

The generated control PDU may include header information comprised of a corresponding 'Control PDU Type' field and 'E' field, omitting the 'Length' field, with respect to the first or second control information positioned at the end of the control PDU structure.

To achieve the above objects, there is also provided a method for receiving control data of a PDCP layer in a mobile communication system, including: receiving a control PDU including one or more first control information and one or more second control information generated at a PDCP layer; and performing header decompression on the received control PDU.

The first control information may be information about a PDCP status report, and the second control information may be header compression feedback information.

To achieve the above objects, there is also provided a transmitting apparatus in a mobile communication system including: a transmission module that generates a control PDU including one or more PDCP status reports and one or more header compression feedback information generated at a PDCP layer and transmits the generated control PDU.

To achieve the above objects, there is also provided a receiving apparatus in a mobile communication system including: a reception module that receives a control PDU including one or more PDCP status reports and one or more header compression feedback information generated at a PDCP layer and performs header decompression on the received control PDU.

In the present invention, when the transmitting side PDCP layer transmits control information such as the status report (referred to as 'first information') or the header compression feedback (referred to as 'second information'), it can add one or more first information and one or more second information to transmit them as a single PDCP Control PDU. Resultantly, compared with the case where the first and second information are transmitted through separate PDCP Control PDUs from the transmitting side to the receiving side, the size of the headers can be reduced.

In addition, because one or more first information and one or more second information are transmitted and received through the single PDCP Control PDU, the size of the headers can be reduced, and thus, a waste of radio resources can be prevented.

BRIEF DESCRIPTION OF THE DRAWINGS

FIG. 6 shows the structure of a PDCP control PDU according to a first embodiment of the present invention;

FIG. 7 shows the structure of a PDCP control PDU according to a second embodiment of the present invention; and FIG. 8 shows the structure of a PDCP control PDU according to a third embodiment of the present invention.

MODE FOR CARRYING OUT THE PREFERRED EMBODIMENTS

Figure 1:
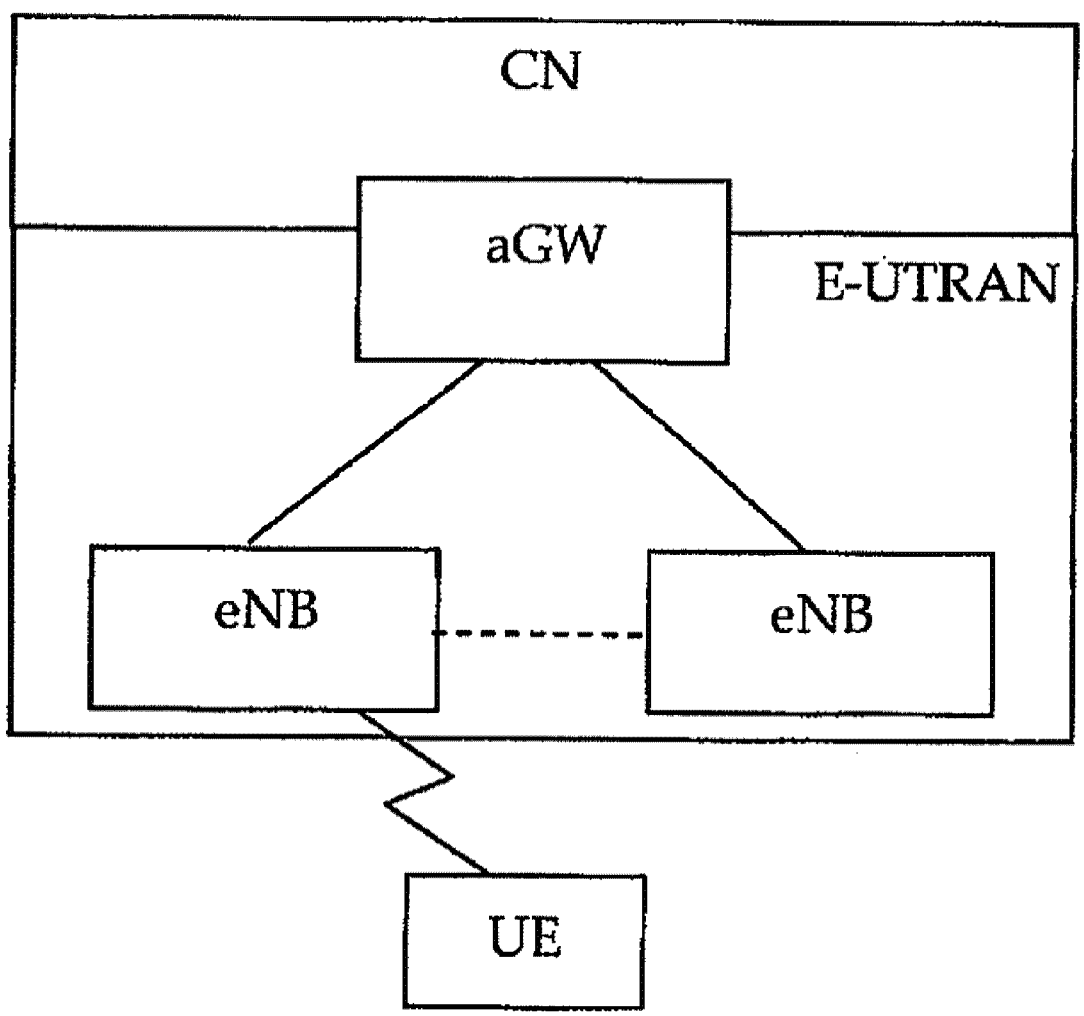
FIG. 1 shows a network structure of a Long Term Evolution (LTE), the related art mobile communication system.
Figure 2:
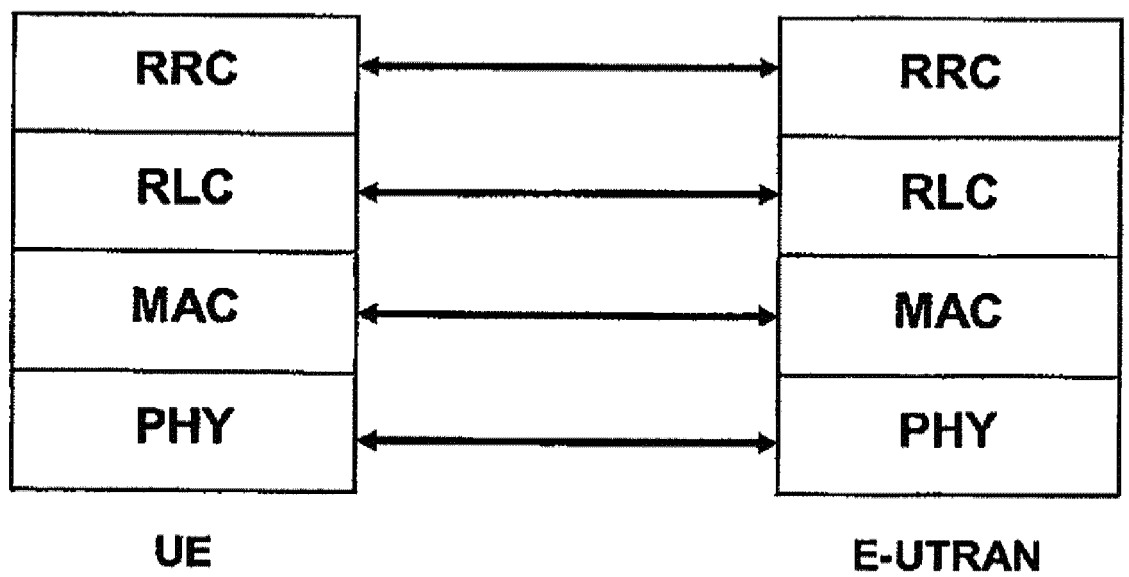
FIG. 2 shows the architecture of a control plane of a radio interface protocol between a terminal and an Evolved-UMTS Terrestrial Radio Access Network (UTRAN) based on 3GPP radio access network standards.
Figure 3:
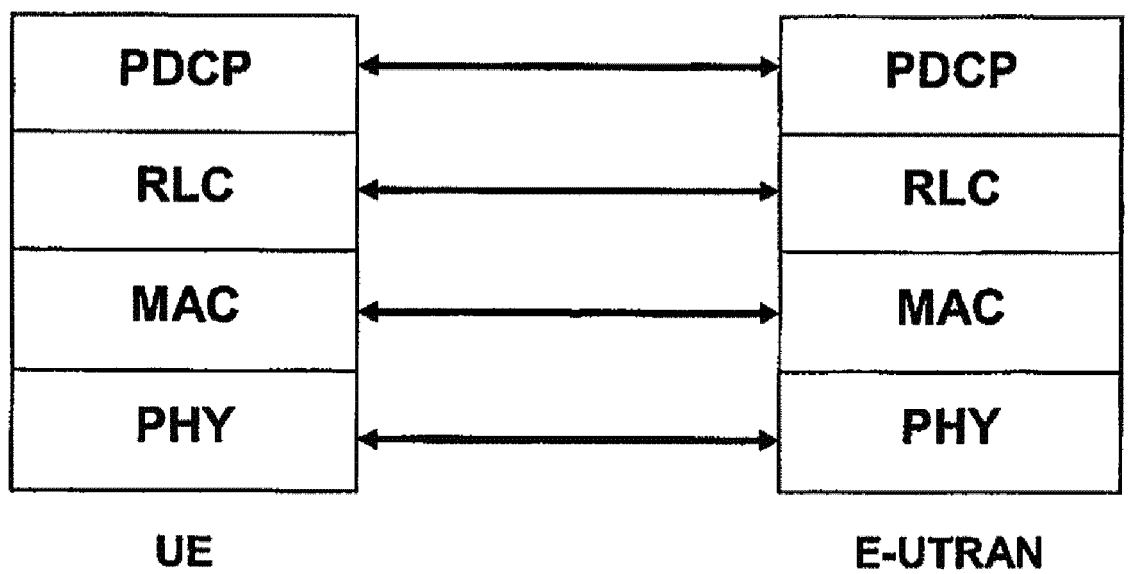
FIG. 3 shows the architecture of a user plane of the radio interface protocol between the terminal and the Evolved-UMTS Terrestrial Radio Access Network (UTRAN) based on 3GPP radio access network standards.
Figure 4:
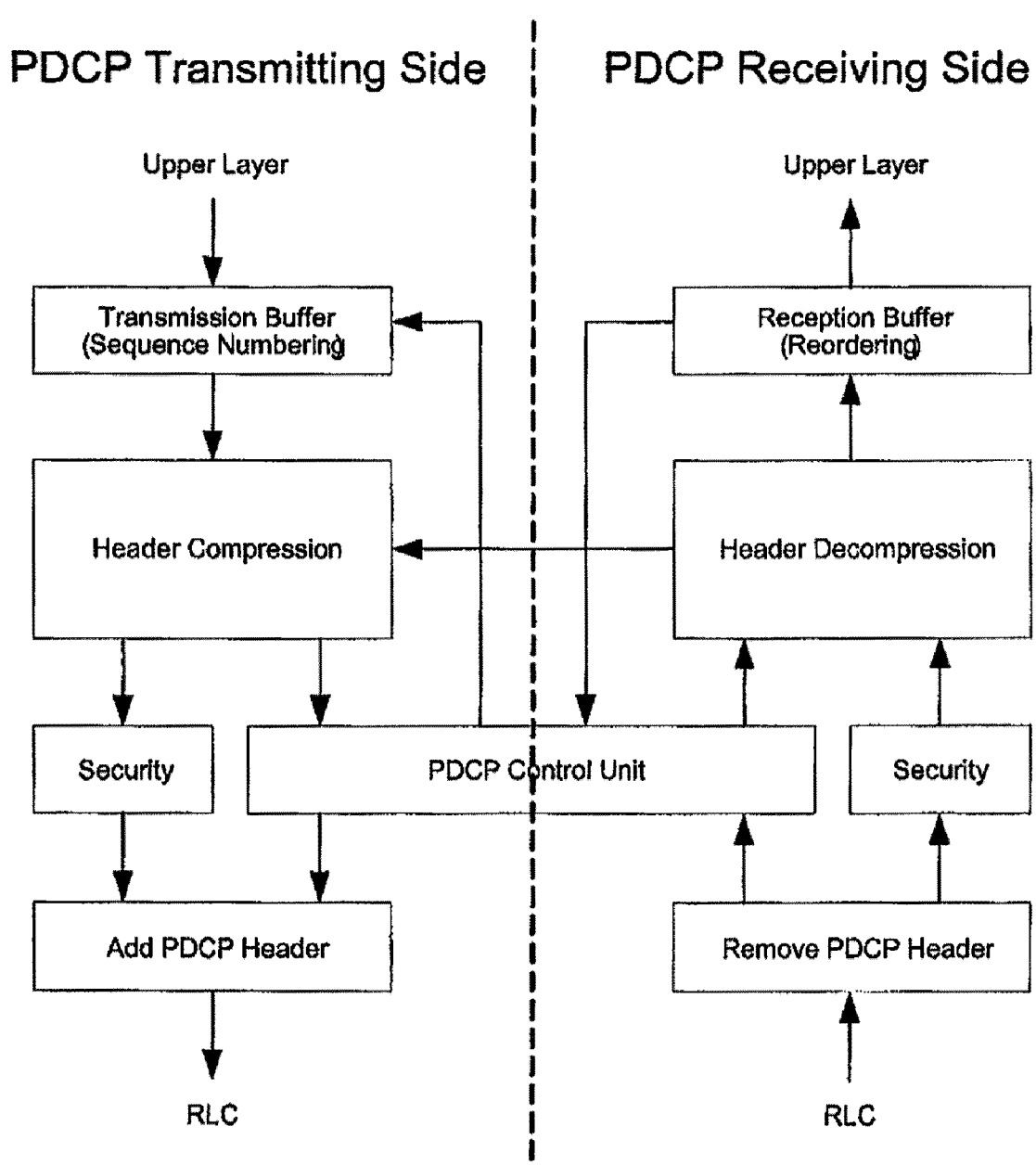
FIG. 4 shows the structure of PDCP entities.
Figure 5:
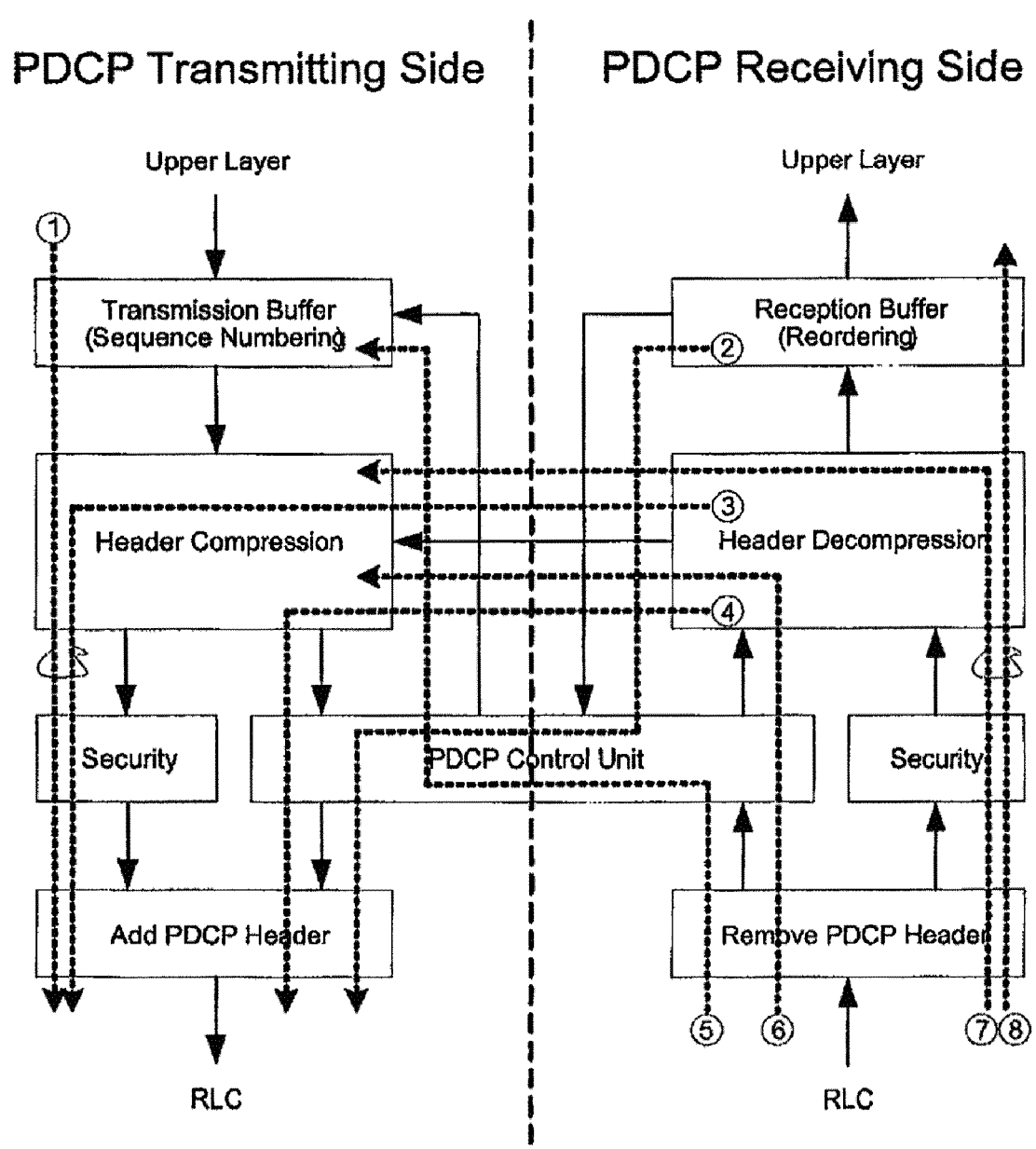
FIG. 5 is a schematic block diagram showing the procedure of processing each PDCP PDU within the PDCP entities.

The present invention is applied to a mobile telecommunications system and, more particularly, to an Evolved Universal Mobile Telecommunications System (E-UMTS) that has evolved from UMTS. However, without being limited thereto, the present invention may be also applied to any mobile telecommunications systems and communication protocols to which technical features of the present invention is applicable.

The present invention may be modified variably and may have various embodiments, particular ones of which will be illustrated in drawings and described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

The present invention is devised upon recognition that if several control information (e.g., information regarding a status report and information about an HC feedback) are simultaneously transmitted through a single control PDU, the size of headers would be reduced, compared with the case where each control information is transmitted through each control PDU from a transmitting side to a receiving side, to thereby improve transmission efficiency and efficiency of resources.

The basic concept of the present invention is 1) a new structure of a control PDU is defined to transmit several control information through a single Control PDU, 2) several control information are included in the defined Control PDU structure (namely, data including several control information as the newly defined Control PDU structure) and transmitted by a transmitting side PDCP, and 3) a receiving side PDCP receives the Control PDU.

In the present invention, the newly defined Control PDU structure includes an E (Extension) field and a size field (or length field). The E field indicates whether there is any additional control information in the header of a PDCP Control PDU, and the length field informs the length of the control information when the control information has a variable length.

In particular, in the present invention, embodiments of the present invention can be differentiated according to the positions of the E field and the length field.

Exemplary embodiments of the present invention will now be described in detail with reference to the accompanying drawings, where those components are rendered the same reference number that are the same or are in correspondence, regardless of the figure number, and redundant explanations are omitted.

FIG. 6 shows the structure of a PDCP Control PDU according to a first embodiment of the present invention. FIG. 6(a) shows a PDCP Control PDU including three control information #1 to #3, and FIG. 6(b) shows a PDCP Control PDU including two control information #1 and #2. Each control information (e.g., control information #1) includes header fields (i.e., Control PDU Type+Length+E) corresponding to (or indicating) the control information.

Each field will now be described with reference to FIG. 6.
D/C: It is a field indicating whether a corresponding PDCP PDU is a Data PDU or a Control PDU.
Control PDU Type: it is a field indicating the type of corresponding control information, for example, whether corresponding control information is status report or HC feedback information.
Length (or size): it is a field indicating the length of the corresponding control information. If the length of control information is determined, the length field may be omitted.
E (Extension): It is a field indicating that a next field indicates one of the two following cases. For example, the value of the E field may be 0 or 1.
That is, 1) the E field indicates the presence of 'Control PDU Type' field+'Length' field+'E' field in this order, corresponding to the next control information (e.g., control information #2 in FIG. 6).
2) The E field indicates the presence of 'Reserved' field for a header type alignment and that control information starts at a next byte.
Reserved: It is a field added for byte-aligning the header part of the Control PDU. Here, the 'Reserved' field may include 0 to 7 bits for byte alignment.

In the first embodiment as shown in FIG. 6, the control PDU is configured such that, with respect to each control information (e.g., control information #1), the 'Control PDU Type' field+'Length' field+'E' field indicating the control information are added in the order to be added to the PDCP control PDU, to the header. When the information about each control information are all added to the header, the Reserved bit (used for the byte alignment) is added as necessary, and the header part is byte-aligned. Thereafter, the control information (e.g., control information #1 to #3) are added in the order of the header information.

The first embodiment as shown in FIG. 6 is disadvantageous in that, if the length of the control information is variable, the length field is always included. In this respect, as for the final control information (e.g., control information #3 in FIG. 6(a)), even if the length field is not provided, it can be calculated from the length field of control information different from the length of the overall control PDU. Thus, if the field order of the control PDU header is changed as shown in FIG. 7, the final control information (e.g., the control information #3 in FIG. 6(a)) could be advantageously omitted.

FIG. 7 shows the structure of a PDCP Control PDU according to a second embodiment of the present invention. FIG. 7(a) shows a PDCP Control PDU including three control information #1 to #3, and FIG. 7(b) shows a PDCP Control PDU including two control information #1 and #2. Each control information (e.g., control information #1) in FIG. 7 includes header fields (i.e., Control PDU Type+E+Length) corresponding to (or indicating) the control information. Namely, compared with the first embodiment as shown in FIG. 6, in the second embodiment as shown in FIG. 7 is different in the position of the E field and an interpretation method. Namely, with respect to the single control information, in the first embodiment as shown in FIG. 6, the header includes 'Control PDU Type'+'Length'+'E' in this order, while in the second embodiment as shown in FIG. 7, the header includes 'Control PDU Type'+'E'+'Length'. Accordingly, the E field is interpreted as follows. Functional characteristics of the other fields are the same as above with reference to FIG. 6.

E (Extension): It is a field indicating that a next field indicates one of the two following cases.

That is, 1) the E field indicates the presence of 'Length' of current control information (i.e., control information #1 in FIG. 7(a))+'Control PDU Type' of next control information (i.e., control information #2 in FIG. 7(a))+'E' field of the next control information (i.e., control information #2 in FIG. 7(a)) in this order.

2) The E field indicates the presence of 'Reserved' field for a header type alignment and that control information starts at a next byte (in case of FIG. 7(b)). Here, the 'Reserved' field may include 0 to 7 bits for byte alignment.

With the method according to the second embodiment as shown in FIG. 7, the length field for the final control information can be omitted. Thus, compared with the first embodiment as shown in FIG. 6, in the second embodiment as shown in FIG. 7, the size of header can be reduced. This means that the configuration of the Control PDU according to the second embodiment in FIG. 7 has higher efficiency of resources than that of the control PDU according to the first embodiment.

FIG. 8 shows the structure of a PDCP Control PDU according to a third embodiment of the present invention. FIG. 8(a) shows a PDCP Control PDU including three control information #1 to #3, and FIG. 8(b) shows a PDCP Control PDU including two control information #1 and #2. Each control information (e.g., control information #1) in FIG. 8 includes header fields (i.e., E+Control PDU Type+Length) corresponding to (or indicating) the control information. Namely, the embodiment as shown in FIG. 8 is a modification of the embodiment of FIG. 7, in which the 'E' field is positioned at the forefront in the header information with respect to the single control information.

The third embodiment as shown in FIG. 8 is not much different from the second embodiment as shown in FIG. 7, except for the configuration of the Control PDU, and advantageous in that, like that of the second embodiment, the length field for the final control information can be omitted. The E field according to the third embodiment as shown in FIG. 8 is interpreted as follows.

E (Extension): It is a field indicating that a next field indicates one of the two following cases.

That is, 1) the E field indicates the presence of 'Control PDU Type' of current control information (i.e., control information #2 in FIG. 8(a))+'Length' of the current control information (i.e., control information #1 in FIG. 8(a))+'E' field of the next control information (i.e., control information #3 in FIG. 8(a)) in this order.

2) The E field indicates the presence of 'Reserved' field for 'Control PDU Type' field+byte alignment of current control information, and that control information starts at a next byte Here, the 'Reserved' field may include 0 to 7 bits for byte alignment.

So far, the description has been made based on the transmitting side in the first to third embodiments of FIGS. 6 to 8, and the configuration of the control PDU according to the present invention is applied to the receiving side. Namely, the receiving side may receive the control PDU the transmitting side PDCP has transmitted, which, namely, includes one or more first control information (PDCP status report) and one or more second control information (header compression feedback information) generated by the PDCP layer, and perform header decompression on the received control PDU. The header decompression has been described above, and the header decompression according to the present invention has the technical characteristics in that the control PDU defined according to the present invention is decompressed.

A transmitting apparatus and a receiving apparatus according to the present invention will now be described.

The receiving apparatus according to the present invention includes hardware, software, a module including software, or the like, which can implement the embodiments of FIGS. 6 to 8.

The apparatus according to the present invention may be called an entity, and if the apparatus is a terminal it can be called a terminal.

The transmitting apparatus according to the present invention includes: a transmission module that generates a control PDU including one or more PDCP status reports and one or more header compression feedback information generated at a PDCP layer and transmits the generated control PDU.

The receiving apparatus according to the present invention includes: a reception module that receives a control PDU including one or more PDCP status reports and one or more header compression feedback information generated at a PDCP layer and performs header decompression on the received control PDU.

The transmitting apparatus and the receiving apparatus according to the present invention basically include, in addition to the above-described elements, software and hardware required for implementing the technical idea of the present invention, for example, an output unit (display, speaker, etc.), an input unit (keypad, microphone, etc.), a memory, a microprocessor, a transmitting/receiving unit (RF module, antenna, etc.). These elements are obvious to the skilled person in the art, so its detailed description will be omitted.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for transmitting control data of a PDCP (Packet Data Convergence Protocol) layer in a mobile communication system, the method comprising:

generating a control PDU (Packet/Protocol Data Unit) including one or more first control information and one or more second control information generated at a PDCP layer; and transmitting the generated control PDU, wherein the generated control PDU includes an E (Extension) field indicating whether next control information exists, wherein the E field indicates the presence of fields in the order of a 'Control PDU Type' filed, a 'Length' field, and an 'E' field, as header information corresponding to the next control information, or the E field indicates, if there is a 'Reserved' field for a header byte alignment, the presence of the 'Reserved' field and that control information starts at the next byte, or the E field indicates that control information starts at the next byte, if there is no 'Reserved' field.

2. The method of claim 1, wherein the first control information is information about a PDCP status report, and the second information is header compression feedback information.

3. The method of claim 1, wherein the E field indicates the presence of fields in the order of the 'Length' field of current control information, the 'Control PDU Type' field of next control information, and the 'E' field of the next control information, or the E field indicates the presence of the 'Reserved' field for a header byte alignment and indicates that control information starts at the next byte.

4. The method of claim 1, wherein the E field indicates the presence of fields in the order of the 'Control PDU Type' field of the current control information, the 'Length' field of the current control information, and the 'E' field of the next control information, or the E field indicates the presence of fields in the order of the 'Control PDU Type' field of the current control information and the 'Reserved' field for the byte alignment, and indicate that control information starts at the next byte.

5. The method of claim 1, wherein the control information is information about a PDCP status report or header compression feedback information.

6. The method of claim 1, wherein the generated control PDU comprises:

a header having header information corresponding to the first control information and/or second control information; and a payload having the first control information and/or second control information, wherein the header includes a 'D/C' field, one or more 'control PDU Type' fields, the 'Length' field, and the 'E' field.

7. The method of claim 6, wherein the generated control PDU further comprises:

the 'Reserved' field for the header byte alignment, and the 'Reserved' field is included in the header.

8. The method of claim 1, wherein the generated control PDU includes header information comprised of a corresponding 'Control PDU Type' field and 'E' field, omitting the 'Length' field, with respect to the first or second control information positioned at the end of the control PDU structure.

9. A method for receiving control data of a PDCP (Packet Data Convergence Protocol) layer in a mobile communication system, the method comprising:

receiving a control PDU including one or more first control information and one or more second control information generated at a PDCP layer; and performing header decompression on the received control PDU, wherein the control PDU includes an E (Extension) field indicating whether next control information exists, wherein the E field indicates the presence of fields in the order of a 'Control PDU Type' filed, a 'Length' field, and an 'E' field, as header information corresponding to the next control information, or the E field indicates, if there is a 'Reserved' field for a header byte alignment, the presence of the 'Reserved' field and that control information starts at the next byte, or the E field indicates that control information starts at the next byte, if there is no 'Reserved' field.

10. The method of claim 9, wherein the first control information is information about a PDCP status report, and the second control information is header compression feedback information.

11. A transmitting apparatus in a mobile communication system comprising:

a transmission module that generates a control PDU (Packet/Protocol Data Unit) including one or more PDCP status reports and one or more header compression feedback information generated at a PDCP layer and transmits the generated control PDU, wherein the generated control PDU includes an E (Extension) field indicating whether next control information exists, wherein the E field indicates the presence of fields in the order of a 'Control PDU Type' filed, a 'Length' field, and an 'E' field, as header information corresponding to the next control information, or the E field indicates, if there is a 'Reserved' field for a header byte alignment, the presence of the 'Reserved' field and that control information starts at the next byte, or the E field indicates that control information starts at the next byte, if there is no 'Reserved' field.

12. A receiving apparatus in a mobile communication system comprising:

a reception module that receives a control PDU (Packet/Protocol Data Unit) including one or more PDCP status reports and one or more header compression feedback information generated at a PDCP layer and performs header decompression on the received control PDU, wherein the control PDU includes an E (Extension) field indicating whether next control information exists, wherein the E field indicates the presence of fields in the order of a 'Control PDU Type' filed, a 'Length' field, and an 'E' field, as header information corresponding to the next control information, or the E field indicates, if there is a 'Reserved' field for a header byte alignment, the presence of the 'Reserved' field and that control information starts at the next byte, or the E field indicates that control information starts at the next byte, if there is no 'Reserved' field.

* * * * *